Jan. 22, 1929.
C. C. PALMERSTON
1,699,912
SUBSURFACE TRENCHING DEVICE FOR IRRIGATION OR DRAINAGE
Original Filed June 22, 1926
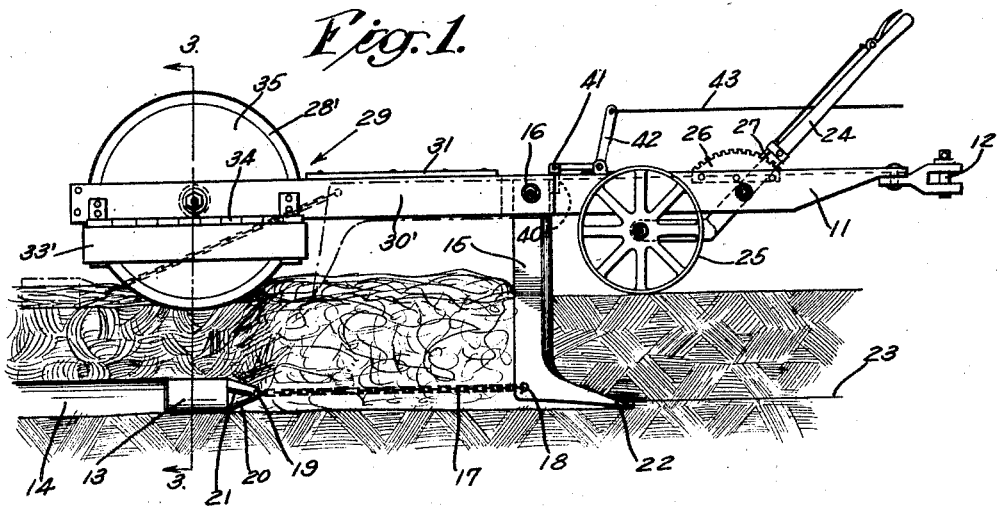
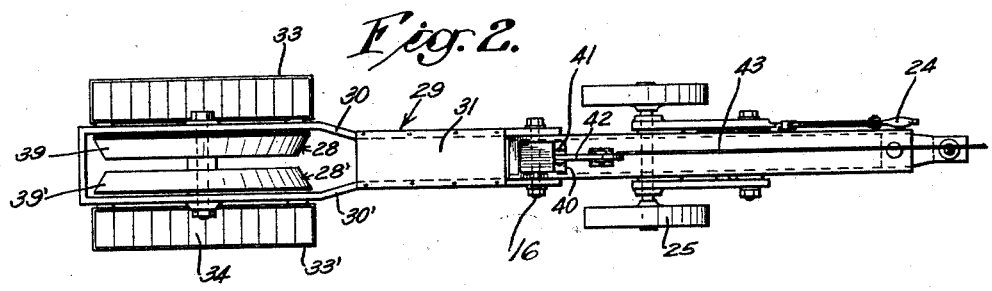
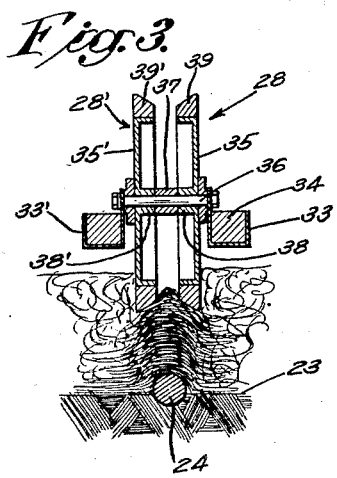
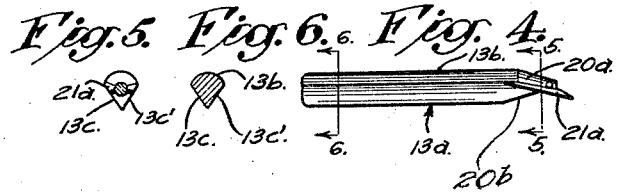
INVENTOR
Colin C. Palmerston
By
ATTORNEY Patented Jan. 22, 1929.

1,699,912

UNITED STATES PATENT OFFICE.

COLIN C. PALMERSTON, OF MONROVIA, CALIFORNIA.

SUBSURFACE-TRENCHING DEVICE FOR IRRIGATION OR DRAINAGE.

Application filed June 22, 1926, Serial No. 117,682. Renewed June 23, 1928.

As may be inferred from the above title, this invention relates to means and methods for forming underground or subsurface passages, suitable for use in bringing water to or carrying water from an agricultural area,—such as an area planted to a grain or hay or cover crop, or an orchard area, or any other area requiring little or no subsequent disturbance of the soil during the period of irrigation or drainage.

It is an object of this invention to obviate the need for laying tile to provide comparatively permanent openings, substantially horizontal or slightly inclined, to convey water to or from a soil, and/or to aerate the same in a favorable manner,—it being well known that the admission of air to a soil is one of the important advantages in so-called "underdraining" operations.

It is an object of this invention to provide a new method of irrigation in which subsurface passages, formed in the novel manner hereinafter described, are maintained for considerable periods of time,—an arch of compacted soil over the mentioned passages being preserved by so conducting irrigating operations as to avoid completely filling said passages.

It is an object of my invention to provide a novel interior form, suitable to be advanced beneath the surface of the ground, the body of this form being of substantially uniform cross-section, and one end thereof being so tapered as to assure a compacting of the soil thereabove, by a wedging action.

It is a further object of my invention to provide, for use in conjunction with a form of the general character described, a rolling compacting member or organization, adapted to advance with said form and to compress the soil thereabove in a manner favorable to the formation of a passage having an arched roof of comparatively dense material,—the curvature of this roof and/or the cohesive characteristics of the soil being, under the conditions of operation, such as to produce the desired horizontal or slightly inclined passages, and preferably such as to permit not only a circulation of water through the mentioned passages but a considerable disturbance of the overlying soil, without risk of a breaking down of the mentioned arched roofs.

It is an object of my invention to provide means whereby a soil may be initially broken up, when in proper consistency, the broken up soil being immediately thereafter provided with subsurface passages suitable for use in irrigating or draining a land area; and, in preferred embodiments of my invention, using an organization comparable to a so-called "shot plow" a cylindrical or other form being secured, as by a chain, to a chisel, post or plow of a usual or preferred type, a compacting device in the form of a wheel or wheels may be so secured as to remain at all times directly above the cylindrical or other movable form,—this compacting device being preferably pivoted to a plow beam or carriage and provided with means, such as boxes disposed at the sides of said wheel or wheels, for carrying any desired weights, to add to the compacting effect.

Other objects of my invention, including the use, in conjunction with the described parts, of means for varying the depth at which the mentioned plow and/or the mentioned movable form are maintained, and the provision of means for tripping said plow, from a remote point, to permit the same to be drawn forward without a plowing effect, and including also a provision of means enabling the mentioned movable form, under the conditions last referred to, to project behind the mentioned compression rollers,—these being preferably adapted to cooperate in the production of a W-shaped surface trench, immediately above a subsurface passage—may be best appreciated from the following description of an illustrative embodiment of my invention, taken in connection with the appended claims and the accompanying drawings, in which Fig. 1 is an elevational view, the soil which is to be provided with an irregation or drainage passage being shown in section.

Fig. 2 is a top plan view of an organization such as that illustrated in Fig. 1.

Fig. 3 is a vertical sectional view, taken substantially as indicated by the line 3—3 of Fig. 1.

Fig. 4 is a side elevational view of an alternative type of movable form.

Figs. 5 and 6 are respectively vertical sections, taken substantially as indicated by the lines 5—5 and 6—6 of Fig. 4.

Referring to the details of that specific embodiment of my invention illustrated in Figs. 1 to 3 inclusive, 11 being a substantially horizontal beam or carriage (shown as forwardly terminating in a clevis comprising a removable pin 12, by which the same may be connected with a tractor, or the like) 13 may be a movable form element, adapted to be drawn forward beneath the surface of any suitable soil, to form a comparatively permanent and continuous opening or channel of the general character shown at 14, for purposes such as irrigation and/or drainage; and the mentioned movable form element may be connected with the beam or carriage 11 in any suitable way, as by means comprising a substantially vertical post 15, (comparatively thin in a transverse direction and shown as pivoted at 16 to said beam or carriage) and a flexible element, such as a cable or chain 17,—shown as connected by a pin 18 to the lower portion of said post and, by an additional pin or equivalent element 19, to said movable form.

When the passage 14 is desired to be circular in cross section, it will be obvious that the body of the movable form 13 may be exactly or approximately cylindrical; and, in order to assure a desired compacting effect, by a wedging action, the movable form 13, or its equivalent, may advantageously be provided with a tapered forward end portion 20, apertured to receive the pin 19, or its equivalent,—it being obvious that I may substitute, according to the nature of the soil and the intended effect, movable forms of any desired size or type; and, if desired, in order to keep the form 13, or its equivalent, at a low level and/or in order to elevate a considerable fraction of the soil encountered thereby (to produce a maximum compacting effect above the said form—so that the resultant arch shall be self-sustaining and even adapted to withstand some vertical pressure) the conical end 20 thereof, or its equivalent, may optionally be provided with lifting means such as inclined external webs or fins 21.

It will be obvious that, depending upon the extent to which it is desirable to disturb the soil through which the movable form 13 is drawn, the post 15, or its equivalent, may be adapted or provided with means, such as a plow blade 22, for cutting and/or agitating the soil traversed; and, in case a plow 22 is intended to cut a trench in a so-called "plow pan" (the level of which may be approximately that indicated by the line 23, Figs. 1 and 3) the plow may be given a somewhat special shape, adapting it to cut a groove of the general character best indicated at 24, Fig. 3; but, regardless of any special features of construction embodied in the form 13 and/or the post 15 and/or the plow 22, and regardless of whether I use means such as a lever 24 carrying ground wheels 25 and provided with a manually adjustable locking device comprising a notched sector 26 and a slidable bolt 27—a rearward movement of the lever 24 being obviously effective to elevate the post 15 and thereby the form 13, or equivalent members—all forms of my invention may comprise, in addition to the described parts, or equivalent parts, a suitable packing organization,—such as a comparatively heavy or weighted roller or rollers 28, 28', so connected with the beam or carriage 11, or with a member or members secured thereto, as to remain above the form 13, or its equivalent, during the rectilinear advance of said form.

In the illustrated embodiment of my invention, a subsidiary carriage 29 comprising side plates 30, 30' and optionally a top plate 31 (capable of supporting a driver's seat, not shown, when the described organization is to be horse-drawn) is shown as pivoted at 16 to the beam or carriage 11 and as carrying, on opposite sides of the wheels or rollers 28, 28', a pair of weight boxes 33, 33',—to contain any desired number of stones or other weights 34.

A single pivot 16 thus serves to permit relative movement not only between carriage 11 and post 15 but between either or both of these elements and a subsidiary carriage 29; and in order to adapt the roller or rollers 28, 28' to exert a powerful compressive effect directly above the form 13, or its equivalent, somewhat as suggested by a crowding of lines in Fig. 3, between the form 13 and the wheels 28, 28', and/or in order that said roller or rollers shall produce a W-shaped surface trench directly above a subsurface passage of the general character described, and/or in order to provide a passage through which the chain 17, or its equivalent, may extend whenever post 15 is permitted to swing into an inoperative position such as that in which it is shown in dotted lines in Fig. 1, I consider it advantageous to get the desired compressive effect by means comprising a pair of discs 35, 35', movable independently or together upon a horizontal axle 36, a spacing element 37 being optionally interposed between hubs 38, 38', and the respective rims 39, 39' being inwardly beveled or inclined, somewhat as shown in Figs. 2 and 3, directly above a maximum-diameter region of form element 13 (13a) to concentrate a compacting effect.

From the foregoing description it will be appreciated that my trenching device is intended to be used in much the same manner as a so-called "shot plow" or "mole plow" except as the form 13, and/or the plow 22 may be of special design, and except as special provision is intended to be made, in most or all cases, for the application of a downward pressure immediately above the form 13, or its equivalent, during the advance thereof in a horizontal or slightly inclined direction; but it is important that the subsurface trenching operations to which my novel organization is adapted be executed at a time when the soil is in a suitable condition,—it being obvious that neither a mucky condition nor a dry and granular condition is favorable to the forming of permanent openings, by means of the general character described. The soil need not be of any single or peculiar type, except as it should not contain too large a percentage of sand or gravel or excessively coarse material; a cultivating or soil-conditioning effect may be obtained incidentally to the described operations (the rearward attachment of, for example, a light harrow being optional); and, assuming the trenches 14 to have been properly formed, their comparative permanence may be assured by proper care in the circulation of water therethrough,—it being important that no part of the same be over-filled to such an extent as to bring the water into contact (except by means of a capillary action) with the contained or circulated water. Introduced water obviously may or may not contain a fertilizing or other soil-conditioning or crop-promoting ingredient; and its rate of flow, whether in or out, should be such as to obviate any appreciable erosion; but it will be understood that, as suggested in Figs. 4, 5 and 6, both the length and the cross-sectional outline of a prismatic or other movable form may be varied, according to the conditions under which the work is done and the intended effect,—the use of a kite-shaped cross-section, as suggested in Figs. 4, 5 and 6 (in which a body 13a is provided with a rounded top 13b, but with downwardly convergent flat sides 13c, 13c',—said top and sides respectively terminating in unlike forwardly-tapering end portions 20a and 20b, separated by a lifting fin 21a) being possibly more advantageous in case a comparatively rapid internal flow must be permitted,—the outline provided, with compacted walls, being in this case substantially the same as that to which erosion might bring an initially cylindrical passage. Obviously the W-shaped trench, externally formed by the wheels 28, 28', may also be used for irrigation, if desired.

The post 15 being capable of occupying either of the positions shown in Fig. 1, it may be held in either of these positions by means such as a latch element 40 shown as connected at 41 to a trip lever 42, adapted to be controlled, from a tractor, by means such as a wire or equivalent tension element 43,—the changes requisite to operation from a driver's seat, supportable from the plate 31, being too obvious, and too immaterial, to require separate illustration and being disclosed merely for the sake of completeness and not as comprising features of novelty.

Although I have herein described a single complete embodiment of my invention, it should be understood not only that various features thereof may be independently used but also that numerous modifications might be made by those skilled in the art to which this case relates, without the slightest departure from the spirit and scope of this invention, as the same is indicated above and in the following claims.

I claim:

1. In means for the production of continuous passages beneath the surface of a soil: means for forming an arched passage therethrough; means for advancing said forming means; and means for compacting the roof of said arched passage by applying pressure directly above said forming means and opposite a region of maximum diameter thereof.

2. In means for the production of continuous passages beneath the surface of a soil: means for loosening said soil; means, movable thereby, for forming an arched passage through said soil; and means for compacting a portion of said soil above said forming means, said compacting means comprising a subsidiary carriage which is pivotally movable relatively to said loosening means but which remains above a region of maximum diameter of said forming means.

3. In means of the general character described: a movable form element; means for advancing the same beneath the surface of the soil; and means. advancing therewith, for compressing soil above said movable form element, said advancing means comprising a beam carrying a plow and said compressing means being a weighted subsidiary carriage which is pivoted to said beam and to said plow.

4. In means of the general character described: a beam; a plow; means, disposed rearwardly of said plow, to form, incidentally to the advance of said plow, a continuous opening of a predetermined cross-section; and means for concentrating a compacting effect above said forming means, said plow and said compacting means being pivotally movable relatively to said beam.

5. In means of the general character described: a beam; a plow; means, disposed rearwardly thereof, to form, incidentally to the advance of said plow, a continuous opening of a predetermined cross-section; and means for concentrating a compacting effect above a region of maximum diameter of said forming means,—said plow being provided with means, comprising a pivoted latch element and means for manipulating the same, to retain the same in either of two angular positions relatively to the surface of the soil traversed.

6. An organization of the general character defined in claim 1 in which said compacting means comprises a plurality of wheel rims spaced apart and inwardly inclined.

7. An organization of the general character defined in claim 1 in which said compacting means comprises a plurality of wheel rims spaced apart; and means for weighting the same.

In testimony whereof, I have hereunto set my hand at Los Angeles, California, this 1st day of June, 1926.

COLIN C. PALMERSTON.